United States Patent [19]

Fletcher

[11] Patent Number: 4,811,163
[45] Date of Patent: Mar. 7, 1989

[54] AUTOMATIC POWER BUS TRANSFER EQUIPMENT

[75] Inventor: Robert L. Fletcher, Richardson, Tex.

[73] Assignee: Varo, Inc., Garland, Tex.

[21] Appl. No.: 3,064

[22] Filed: Jan. 14, 1987

[51] Int. Cl.[4] .............................................. H02H 7/00
[52] U.S. Cl. ........................................ 361/8; 361/5; 361/13; 307/64; 307/141.8
[58] Field of Search ................. 361/2, 3, 5, 6, 8, 13; 307/134, 135, 137, 140, 141.8, 64, 65

[56] References Cited

U.S. PATENT DOCUMENTS

| 3,184,619 | 5/1965 | Zydney | 307/134 |
|---|---|---|---|
| 3,267,302 | 8/1966 | Breiner et al. | 307/137 |
| 3,555,353 | 1/1971 | Casson | 361/13 |
| 3,588,605 | 6/1971 | Casson | 361/13 |
| 3,639,808 | 2/1972 | Ritzow | 361/13 |
| 3,922,559 | 11/1975 | Migeon | 307/64 |
| 3,982,137 | 9/1976 | Penrod | 361/8 |
| 4,025,820 | 5/1977 | Penrod | 361/8 |
| 4,068,273 | 1/1978 | Metzler | 361/7 |
| 4,152,634 | 5/1979 | Penrod | 361/13 |
| 4,189,649 | 2/1980 | Przywozny et al. | 307/64 |
| 4,209,814 | 6/1980 | Garzon | 361/5 |
| 4,251,845 | 2/1981 | Hancock | 361/8 |
| 4,356,525 | 10/1982 | Kornrump et al. | 361/13 |
| 4,389,691 | 6/1983 | Hancock | 361/8 |
| 4,438,472 | 3/1984 | Woodworth | 361/13 |
| 4,466,038 | 8/1984 | Robertson | 361/8 |
| 4,525,762 | 6/1985 | Norris | 361/13 |
| 4,638,175 | 1/1987 | Bradford et al. | 307/65 |

Primary Examiner—A. D. Pellinen
Assistant Examiner—Jeffrey A. Gaffin
Attorney, Agent, or Firm—Jerry W. Mills

[57] ABSTRACT

A circuit for protecting the power contacts (18, 20) of automatic bus transfer equipment, including high speed solid state switches (30, 32) connected across the respective contacts. A timing and steering circuit (36) is responsive to the electrical energization of a solenoid (22) for firing the solid state switch (32) connected across the closed contact (18). A timer (48) is responsive to the opening of the contacts (18). At the elapse of a time period, the firing circuit (34) is caused to operate the solid state switch (30) before the closing of the contacts (20). The solid state switch (30) is maintained operated for a predetermined period of time by a timer (90).

25 Claims, 3 Drawing Sheets

AUTOMATIC POWER BUS TRANSFER EQUIPMENT

TECHNICAL FIELD OF THE INVENTION

The present invention relates in general to electrical power systems, and more particularly relates to methods and apparatus for accomplishing transfers between multiple power sources without a substantial interruption in the power delivered.

BACKGROUND OF THE INVENTION

Many types of electrical equipment require duplicated power systems to insure that power can be reliably and continuously delivered to a load. Typically, one power source will be designated the master power source for delivering AC or DC power to the load. In such a duplicated system, an auxiliary switched to the load on the detection of a failure of the master power source. The faulty power source is removed from the load so that is does not interfere with the online auxiliary power source. Many applications employing master and auxiliary power sources require that the switching from the faulty power source to the other power source occur in a very short period of time so that the load current or voltage is not substantially interrupted. Some situations, for example, submarine computerized navigation systems, require that power interruption during a switchover be no longer than a few milliseconds. Otherwise, the computerized system enters into a mode wherein normal operations cannot be sustained until several minutes thereafter.

The conventional approach in switching from one power source to another, either automatically or manually, is to connect the load to the master power source by a normally closed contact of a heavy duty relay or solenoid, and connect the load to the auxiliary power source through a normally opened contact of the relay. When the relay is operated, the switchover from the master power source to the auxiliary power source is accomplished. The problem attendant with this technique is that with large wattage power supplies which may range from several kilowatts to several thousand kilowatts, the relay contacts become deteriorated due to arcing, and thus becomes less reliable. The dangers of arcing are apparent in explosive atmospheres. Arc suppression circuits are well documented in the art, such as those disclosed in U.S. Pat. Nos. 4,251,845; 4,389,691 and 4,466,038.

An additional concern of critical importance exists when switching power sources generating AC currents. Preferably, power is switched from one power source to the other during zero-crossings of the alternating current cycle to reduce electrical arcing across the relay contacts. However, when the master and auxiliary power sources are not frequently synchronized, the zero-crossings thereof are also not synchronized, and thus the power sources cannot be simultaneously switched during respective low power portions of the AC cycle. This situation is aggravated when contact arc suppression devices, such as those disclosed in the noted patents, short circuit the relay contact before the actual opening and closing, and remain on a short period of time after the contact opening or closing. Thus, this presents a situation in which both contact may be momentarily closed, thereby short circuiting the master power source to the auxiliary power source.

From the foregoing, it can be seen that a need exists for a reliable and automatic bus transfer device which monitors various electrical parameters of each power source, and thus effects a transfer at the optimum time. An additional need exists for an improved automatic bus transfer device which can be easily applied to an existing relay-type bus transfer system, without modification of the system or degradation of the reliability thereof.

SUMMARY OF THE INVENTION

In accordance with the present invention, automatic bus transfer equipment is disclosed which reduces or substantially eliminates the shortcomings associated with corresponding prior art equipment.

The apparatus of the automatic bus transfer equipment of the invention can be retrofitted to conventional relay-type power transfer systems, and operated without the requirement of additional steps or knowledge on the part of the operator. The bus transfer enhancer of the invention is thus transparent to the existing equipment as well as to the operator. Conventional automatic bus transfer system normally include a main power contactor solenoid having a single-pole double-throw switch arrangement. The master power source and an auxiliary power source are connected to the respective poles, while the load is connected to the switched contactor terminal. A solenoid associated with the contactor can be energized either manually or automatically for effecting a transfer of the load from the master power source to the auxiliary power source, or vice versa. Additional subsidiary single-pole single-throw contacts are available for switching in timed correspondence with the main contactor contacts.

The invention includes a high speed solid state bidirectional power switch connected across the master main contacts associated with the master power source, and a second high speed solid state bidirectional power switch connected across the auxiliary main contacts associated with the auxiliary power source. Provided also are plural timing circuits which are responsive to the contactor solenoid voltage to operate the bidirectional power switches in a timed manner to prevent arcing of the main contacts during opening and closing thereof.

On the application of a voltage to the contactor solenoid to switch the load from the master power source to the auxiliary power source, but before the master main contact have operated, the high speed power switch connected across the closed master main contacts is fired or otherwise driven into conduction. During the physical movement of the master main contact in removing the master power source, the fired power switch connected thereacross prevents arcing. One of the noted timing circuits maintains the master power switch fired after the opening of the master main contacts until it is assured that the AC signal of the master power source has gone through a zero crossing. The trigger input of the power switch is then removed by the timing circuit, and the power switch is automatically extinguished or cutoff by the occurrence of a master power source zero crossing. The master power source is then completely removed from the load.

After a predetermined period of time which is related to the cyclical period of the AC power sources, the timing circuit which is triggered by the opening of the master power contacts triggers another timing circuit. For 400 cycle AC operation, the timing circuit produces a time period which is somewhat longer than one half of the 400 hertz cycle to assure that a zero crossing will be experienced. After such time period, the power switch connected across the auxiliary main contacts is fired. This occurs before the physical closing of the auxiliary main contacts, and thus arcing of the closing auxiliary main contacts is prevented.

In addition to firing the auxiliary power switch, an additional timer is activated to maintain the auxiliary power switch on until it is assured that the auxiliary main contact have been completely closed, thereby connecting the load to the auxiliary power source. Drive is then removed from the auxiliary power switch allowing it to automatically extinguish on the next zero crossing of the auxiliary power source cycle.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same parts or elements throughout the views, and in which.

DETAILED DESCRIPTION OF THE INVENTION

Figure 1:
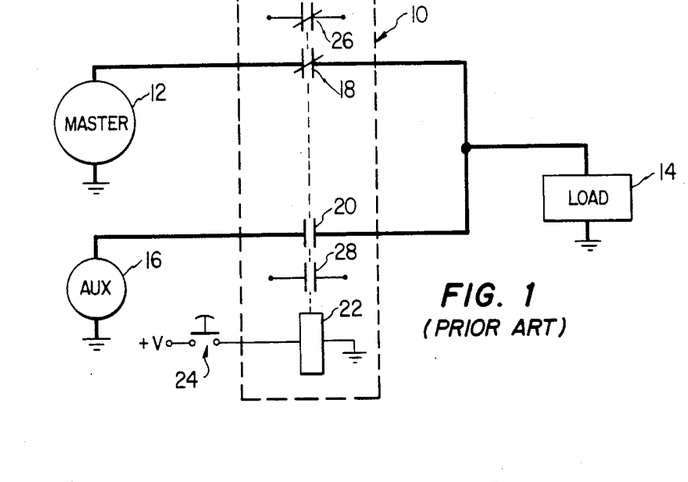
FIG. 1 is an electrical schematic illustration of a bus transfer device well known in the art.

In order to better understand the application of the present invention, reference is made first to FIG. 1 of the drawings where there is illustrated bus transfer apparatus well known in the art. The conductors which carry large currents are shown in heavy bold lines. Specifically, a single-pole double-throw contactor switch 10 enables either the switched connection between a master power source 12 and a load 14, or a switched connection between an auxiliary power source 16 and the load 14. The power contactor 10 includes a normally closed master main contact 18 and a normally open auxiliary main contact 20. The load 14 is connected in parallel to one terminal of each of the normally closed contact 18 and normally open contact 20. The other terminal of each of the main contacts 18 and 20 is connected to the respective master power source 12 and auxiliary power source 16. Typically, the power contactor 10 is constructed so that during switching from the normally closed to the normally open contacts, a period of time exists in which neither contact is closed, thereby eliminating the possibility of connecting the master power source 12 directly to the auxiliary power source 16.

The actuation of the power contactor 10 to effect a switchover from the master power source 12 to the auxiliary power source 16, or vice versa, is achieved by the operation of an associated solenoid 22. The solenoid 22 is connected across a voltage source in series with a switch 24. The manual actuation of the switch 24 is effective to operate the solenoid 22 and thereby change the position of the contactor main contacts 18 and 20. According to typical power contactor construction, a period of at least 50 milliseconds is required after the closing of the manual switch 24 to effect a complete switchover of the contactor main contacts 18 and 20. This time period is due in a large part to the physical nature of the contactor 10 which requires a certain amount of time to achieve a physical displacement of the contactor armature to perfect a contact switchover from one position to another. Additionally, the contactor 10 is of the type in which the constant application of power applied thereto is not required in order to hold the contactor in either of its switched states. Therefore, for each closure of the switch 24, the main contacts 18 and 20 of the contactor 10 switch to the other position. While the contactor 10 is shown responsive to the manual depression of switch 24, the automatic energizing of contactor solenoid 22 may be conducted without adversely affecting the construction or operation of the present invention. For example, monitor circuits may be connected to the master and auxiliary power sources 12 and 16, and on the failure of one, the contactor may be automatically operated to bring on line the other power source.

Power contactors 10 having additional subsidiary contacts 26 and 28 are also readily available. Subsidiary contact 26 is associated with master main contact 18, in that both such contacts operate together to provide an open or closed electrical path. Contacts 20 and 28 are comparably constructed. The additional subsidiary contacts 26 and 28 may or may not be of heavy duty type which are capable of carrying currents supplied by high wattage power sources.

Figure 2:
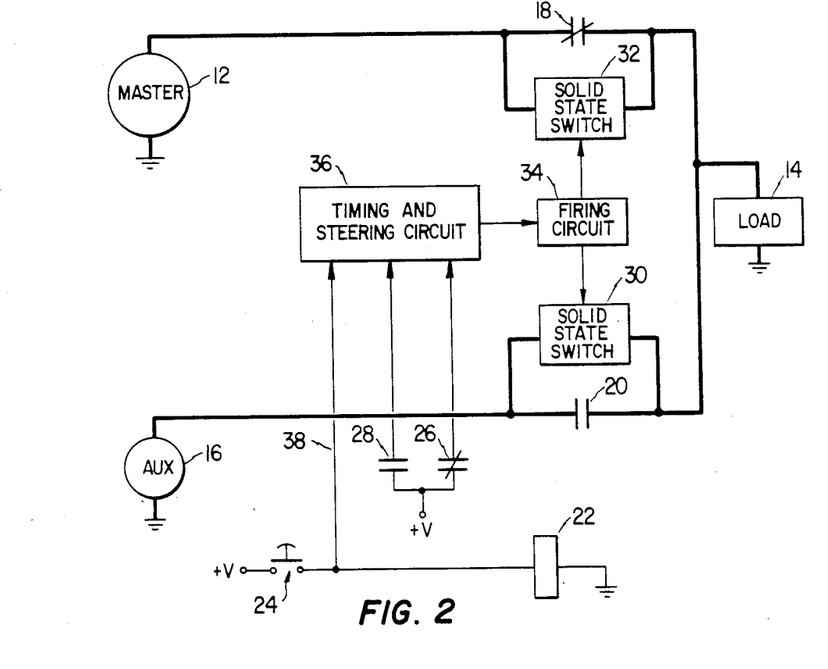
FIG. 2 is an electrical schematic illustration of the automatic bus transfer enhancer constructed in accordance with the invention.

The invention is illustrated in circuit block diagram form in FIG. 2. Connected in parallel across the master main contacts 18 is a high speed solid state switch 32. When the master power source 12 is an AC source, the switch 32 is bidirectional, such as a semiconductor triac, or a pair of back-to-back silicon controlled rectifiers (SCRS). In the event the master power source 12 is a DC supply, the switch 32 can be a power transistor, or the like. A second switch 30 is comparably associated with the auxiliary main contacts 20. A firing circuit 34 is operative to trigger the solid state switches 30 and 32 independently of each other for providing a conduction path in parallel with the respective contactor main contacts 18 and 20. A timing and steering circuit 36 is operative to direct a firing signal to the firing circuit 34 for triggering the solid state switches 30 and 32 in a predetermined sequence. The timing and steering circuit 36 includes a number of timers responsive to the actuation of the solenoid 22.

It can be seen from FIG. 2 that the original components and elements of the automatic bus transfer apparatus are intact, and the enhancement equipment of the invention is merely added thereto. In operation, the automatic bus transfer enhancement apparatus is set into operation by the actuation of switch 24. The +V voltage is thus applied to the contactor solenoid 22, as well as by line 38 to the timing and steering circuit 36. It is highly important to realize that the contactor solenoid 22 is mechanical in nature, and thus require about 50-100 milliseconds to provide a physical closure and opening of the respective main contacts 18 and 20. In contrast, there is no physical or mechanical momentum associated with either the timing and steering circuit, or the firing circuit 34, or the solid state switches 30 and 32. Hence, when the switch 24 is closed and the +V voltage is applied to the timing and steering circuit 36, the solid state switches 30 and 32 can be operated in a matter of microseconds thereafter.

As noted above, the operation of the automatic bus transfer enhancement apparatus of FIG. 2 is initiated by the operation of the manual switch 24. The voltage +V is thus applied by line 38 to the timing and steering circuit 36. Almost instantly, the voltage +V is applied by line 38 to the timing and steering circuit 36. It is assumed for the present example that the master power source 12 is connected through the master main contacts 18 to the load 14. Accordingly, the timing and steering circuit 36 couples a signal to the firing circuit 34 such that the solid state switch 32 is closed. Thus, solid state switch 32 provides a current path in parallel with the yet-closed master main contacts 18. The application of the voltage +V through the switch 24 also energizes the contactor solenoid 22, thereby opening contactor main contacts 18. Simultaneously master subsidiary contact 26 also opens. The opening of master subsidiary contact 26 also provides an input to the timing and steering circuit 36 to start a timer to provide for the removal of the trigger to the solid state switch 32. The timer then removes the trigger signal from the solid state switch 32. The solid state 32 switch is turned off when the current produced by the master power source 12 undergoes a zero crossing. For a master power source producing 400 hertz power, a zero crossing is assured to occur in about 1.8 milliseconds. For sixty cycle power sources, a zero crossing is assured to occur within a time period greater than about 8.5 milliseconds.

Even though the timer in the timing and steering circuit 36 removes the drive from the solid state switch 32, such switch 32 remains conducting for a short period of time until the next zero crossing. However, on the next zero crossing, the conduction of the solid state switch 32 is automatically extinguished. In response to the removal of the trigger from the solid state switch 32, the timing and steering circuit 36 provides another signal to the firing circuit 34 for triggering the solid state switch 30. This second trigger signal is initiated after it is assured that switch 32 has been extinguished. The triggering of solid state switch 30 also occurs before the auxiliary main contacts 20 have been physically closed. Thus, solid state switch 30 provides a preliminary conduction path between the auxiliary power source 16 and the load 14 before the closing of the auxiliary main contacts 20. Within 50–100 milliseconds after the closing of switch 24, the mechanical inertia of the contactor solenoid 22 is overcome, whereby the auxiliary main contacts 20 close. Simultaneously with the closure of auxiliary main contacts 20, subsidiary contacts 28 also close, thereby arming the timing and steering circuit 36 for the next bus transfer sequence, if any. The timing and steering circuit 36 maintains the firing signal coupled to the firing circuit 34 for a predetermined time, and thereafter removes the drive from the solid state switch 30. Once the drive to solid state switch 30 is removed, the next zero crossing of the current produced by the auxiliary power source 16 automatically extinguishes the conduction of the switch 30.

With the provision of the automatic bus transfer enhancer briefly described in connection with FIG. 2, the solid state switches 30 and 32 are driven in a timed sequence to conduct before the opening or closing of the associated contactor main contacts, and are extinguished shortly after the mechanical closure or opening of the contactor main contacts to thereby prevent arcing. Not only is the life of the power contactor main contacts 18 and 20 extended, but also no sparks are generated to produce a dangerous situation in explosive environments.

While not described in connection with FIG. 2, a second closure of switch 24 is operative to again energize the solenoid 22 and disconnect the load from the auxiliary power source 16 and reconnect it to the master power source 12. A comparable operation of the automatic bus transfer enhancer of the invention occurs to provide the timed triggering of the solid state switches 30 and 32 to prevent arcing of the associated contactor main contacts 20 and 18.

With reference now to FIG. 3, there is shown a detailed schematic illustration of the timing and steering circuit 36 of the invention. In the preferred form of the invention, the timing and steering circuit 36 is constructed by connecting the contactor subsidiary contacts 26 between a five volt DC source and one input of a NAND logic gate 42. The contactor subsidiary contacts 26 are also connected in parallel through an RC network 44 to ground and through a capacitor 46 to the input of a first zero crossing timer 48. The input of the zero crossing timer 48 is also connected through a parallel combination of a resistor 50 and a diode 52 to the five volt DC source. The contactor subsidiary contacts 28 are comparably connected between the five volt DC source and one input of a NAND logic gate 54, a RC network 56, and through a coupling capacitor 58 to the input of a second zero crossing timer 60. The input of the zero crossing timer 60 is connected through a parallel resistor 62 and diode 64 to the five volt DC source.

The other inputs of the NAND logic gates 42 and 54 are connected together, and through a parallel resistor 66 and Zener diode 68 arrangement to ground. In addition, the parallel resistor 66 and diode 68 arrangement is connected to a resistor-capacitor circuit 70 which is associated with bridger rectifier diode pairs 72 and 74. The bridge diode pairs 72 and 74 are connected across the secondary of a transformer 76. The primary of the transformer 76 is connected to the voltage which operates the contactor solenoid 22 (not shown). With the rectifier arrangement, a burst of AC energy applied to the solenoid 22 and the transformer 76 produces a corresponding digital logic high pulse applied through the coupling capacitor to an input of both NAND logic gates 42 and 54.

The output of NAND gate 42 is connected to the clear (CLR) input of a D-type latch 78. The output of the zero crossing timer 60 is connected in parallel to the input of an inverter 80, as well as to one input of a two-input NOR gate 82. The output of the inverter 80 is connected to the clock (CLK) input of the latch 78. The D input of latch 78 is grounded.

The output is the NAND gate 54 is connected to the clear (CLR) input of a second D-type latch 84. The output of the zero crossing timer 48 is connected in parallel to an inverter 86 and to the other input of the NOR logic gate 82. The output of the inverter 86 is connected to the clock (CLK) input of the latch 84. The D input of the latch 84 is grounded. The output of the latches 78 and 84 are connected respectively to the inputs of 100 millisecond timers 88 and 90.

The output of the NOR logic gate 82 is connected to the input of an inverter 92, and the output of the inverter 92 is connected to the input of a 200 millisecond (ms) timer 94. The output of the 200 ms timer is connected to the input of an inverter 96. The output of inverter 96 is connected to the reset inputs of the respective zero crossing timers 48 and 60. The output of the 100 ms timer 88 is connected in parallel to the respective inputs of an inverter 98, a NOR logic gate 100 and the A and B inhibit inputs of a dual output driver 102. The dual output driver 102 utilized in accordance with the preferred embodiment of the invention is identified as integrated circuit type UC1706 manufactured by Unitrode Corporation, Lexington, Me.

In like manner, the output of the 100 millisecond timer 90 is connected to the respective inputs of an inverter 104, a NOR logic gate 106 and the A and B inhibit inputs of a second dual output driver 108. The outputs of inverters 98 and 104 are connected respectively to the inputs of respective NAND gates 110 and 112, and also to the inverting inputs of the dual output drivers 102 and 108. The outputs of the NAND logic gates 110 and 112 are connected respectively to the inputs of inverters 114 and 116. In addition, the output of NAND gate 110 is connected to another input of NOR gate 106. In a similar manner, the output of NAND logic gate 112 is connected to the other input of the NOR logic gate 100. The outputs of the NOR gates 100 and 106 are connected respectively to the preset (PR) inputs of the latches 78 and 84. The output of inverter 114 is connected to the reset input of 100 ms timer 90, while the output of inverter 116 is connected to the reset input of 100 ms timer 88.

A 34 kilohertz square wave oscillator 118 has an output connected to the noninverting input of the respective dual output drivers 102 and 108. The dual output driver 102 includes two outputs 120 and 122, each adapted to produce a 17 Khz output with a 180 degrees phase difference therebetween. The outputs 124 and 126 of dual output driver 108 operate comparably. The drivers 102 and 108 provide driving signals for the firing circuit 34 of FIG. 3b.

In the preferred form of the invention, the zero crossing timers 48 and 60, the 100 ms timers 88 and 90, as well as the 200 ms timer 94 are all singleshot, or monostable circuits. Conventional 555 singleshot timers are well adapted for providing an output pulse of a desired width in response to an input transition. The timers described herein are responsive to an input falling edge transition to produce an output positive pulse. The pulse width is determined by the time constant of a resistance and capacitance (not shown) connected to the timers.

The D-type latches 78 and 84 are of the conventional type which are responsive to input rising edge transitions to shift the logic level appearing on the D-input to the Q output. The preset (PR) inputs of the latches 78 and 84 are responsive to a falling edge transition to force the Q output high. Conversely, the clear (CLR) inputs of the latches 78 and 84 are responsive to a falling edge transition for forcing the Q outputs to a logic low state.

The dual output drivers 102 and 108 are of the type which couple the 34 kilohertz signal of the oscillator 118 to the dual outputs thereof when the A and B inhibit inputs are at a logic high, and the inverting input is at a logic low. No signal inversion occurs between the noninverting input and the dual outputs of the drivers 102 and 108. However, the drivers 102 and 108 each include a divider for producing a 17 Khz output from the 34 Khz input. As noted above, the dual outputs of each driver 102 and 108 are out of phase. The devices identified above are well suited to provide the functions according to the invention, however, other circuits can be used with equal effectiveness.

In describing the detailed operation of the timing and steering circuit 36 according to an example, it is initially assumed that the master power source 12 is connected through the master main contacts 18 to the load 14. Auxiliary main contacts 20 are open, thereby isolating the auxiliary power source 16 from the load 14. It is also assumed, according to the example, that it is desired to transfer the load 14 from the main power source 12 to the auxiliary source 16.

The depression of the switch 24 initiates the bus transfer. The contactor subsidiary contacts 26 and 28 are in the state shown in FIG. 3A. It is also assumed that the contactor solenoid 22 is of the type which is operated by an AC voltage. In response to the depression of the switch 24, an AC solenoid voltage is applied to the transformer 76. The switch is operated manually for a time satisfactory to accomplish the operation of the solenoid 22. The AC burst of energy is rectified by bridge diode pair 72 and 74, and filtered by the resistor-capacitor arrangement 70. A resultant positive-going pulse is maintained under a predetermined amplitude by the clipping action of the Zener diode 68. The pulse is applied to one input of the NAND gates 42 and 54. The positive pulse applied to the input NAND gate 54 has no affect, as the auxiliary subsidiary contacts 28 are open and the resistor-capacitor network 56 maintains a logic low level on the other input of the gate 54.

Because the master subsidiary contacts 26 are closed, five volts DC is applied to the other input of the NAND logic gate 42. As a result, the output of NAND gate 42 is driven to a logic low, thereby clearing the D-type latch 78 and driving the Q output thereof to a logic low. The low-going transition on the output of the latch 78 triggers the 100ms timer 88, whereupon the output thereof is driven to a logic high for a maximum of about 100 milliseconds. After the latch 78 has been cleared by NAND gate 42, it is quickly preset by a negative transition produced by NOR gate 100. Latch 78 is thereby ready for subsequent clearing or clocking. The output positive pulse of the timer 88 enables the dual output driver 102 to drive the solid state switch 32 into conduction. The operation and the manner in which the firing circuit 34 of FIG. 3A triggers the solid state switch 32 of FIG. 3B will be described in more detail below.

Figure 3A:
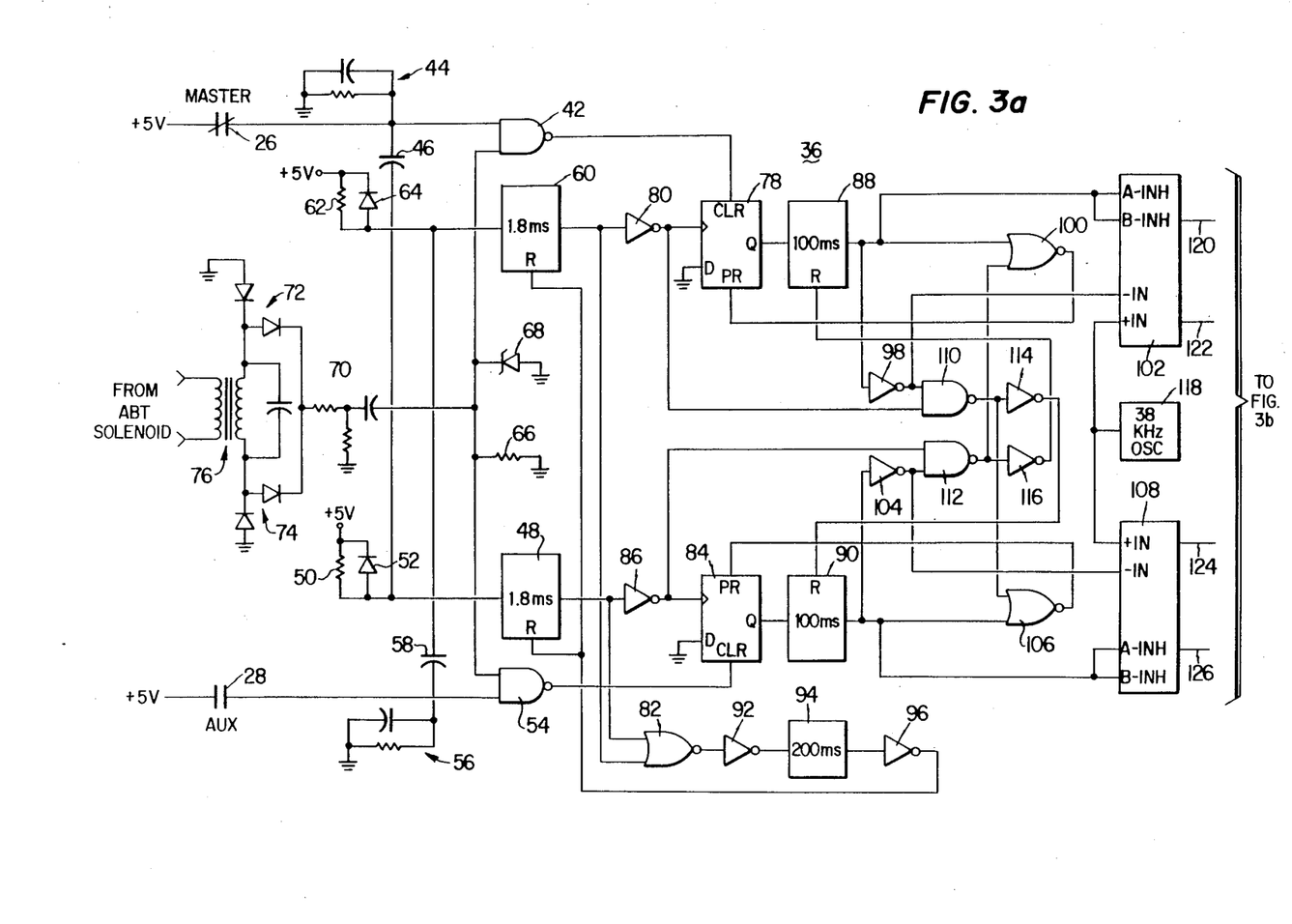
FIGS. 3a and 3b are detailed electrical schematics of the timing and power switch circuits of the invention.

During the active state of the 100 millisecond timer 88, the inverter 98 drives the noninverting input of the dual output driver 102 with a logic low, thereby satisfying the input requirements of the device to couple the signal from the oscillator 118 to both outputs 120 and 122 of the driver 102.

It should be understood at this point that in the time during the switchover from the master power source 12 to the auxiliary power source 16, the master main contacts 18 have not yet opened. However, when the master main contacts 18 open, the corresponding master subsidiary contacts 26 also open. In conjunction with the opening of the subsidiary contacts 26, the resistor-capacitor network 44 couples a negative-going pulse through capacitor 46 to the input of the zero crossing timer 48. Timer 48 is thus triggered, producing an output positive pulse which is applied to the input of inverter 86. A corresponding negative pulse is applied to one input of the NAND gate 112, which is inverted by inverter 116, and applied to the reset input of the 100 ms timer 88. In response to the reset input, the output of timer 88 is driven in a logic low, thereby disabling the dual output driver 102, and removing drive from the solid state switch 32. During the power switchover in transferring from the master power source 12 to the auxiliary power source 16, the 100 ms timer 88 is prematurely reset by inverter 116 before the such timer times out.

When the solid state switch 32 comprises a triac, or a pair of back-to-back SCRs, such devices will not automatically turn off until the load current passes through a zero crossing or minimum point. Thus, for power sources generating 400 hertz energy, the solid state switch 32 may remain conductive for a maximum of about 1.5 milliseconds, even though its input drive has been removed.

For the foregoing reason, the zero crossing timer 48 is constructed to provide a positive output pulse having a width somewhat greater than 1.5 milliseconds, i.e., on the order of about 1.8 milliseconds. Thus, on the rising edge of the output pulse of the zero crossing timer 48, the drive to the solid state switch 32 is removed. 1.8 milliseconds later, i.e., on the falling edge of the output pulse of timer 48, the latch 84 is clocked. When clocked, the output of latch 84 is driven to a logic low, thereby also triggering the 100 millisecond timer 90.

The positive pulse output by the 100 ms timer 90 provides an input to the dual output driver 108 which couples to the firing circuit 34 a trigger signal to drive the solid state switch 30 into conduction. When triggered or fired, the solid state switch 30 is connected in parallel across the auxiliary main contacts 20. Importantly, the solid state switch 30 is connected across the auxiliary main contacts 20 before such contacts become mechanically closed. In this case, the timer 90 is not prematurely reset, but rather times out after about 100 milliseconds. The 100 millisecond criterion associated with timer 90 assures that when the mechanics and inertia of the contactor 10 are taken into consideration, the auxiliary main contacts 20 are closed in such a period of time after the actuation of the switch 24. Accordingly, after about a 100 milliseconds, the output of timer 90 returns to a logic low, thereby inhibiting the dual output driver 108 and removing drive from the solid state switch 30. Switch 30 is thus removed from its parallel connection accross the auxiliary main contacts 20. At this point, the master main contacts 18 have opened to remove the master power source 12 from the load 14, and the auxiliary main contacts 20 have closed, thereby connecting the auxiliary power source 16 to the load 14. Also, the solid state switches 30 and 32 are both deactivated, and the system functions with the auxiliary power source 16 supply power connected to the load 14.

A lockout feature of the invention is provided by the 200 millisecond timer 94. After the output of the zero crossing timer 48 has returned to a logic low level, the timer 94 is triggered through intermediate logic gates 82 and 92. When triggered, the timer 94 produces an output positive pulse for 200 milliseconds which forces a logic low on the reset inputs of both zero crossing timers 48 and 60. The logic low applied to the zero crossing timers 48 and 60 prevents their retriggering for 200 milliseconds due to any spurious or transient signals which may be associated with the electromagnetic operation of the automatic bus transfer contactor switches or solenoid.

After the auxiliary bus transfer apparatus has been switched to the new state, wherein the auxiliary power source 16 is connected to the load 14, the auxiliary subsidiary contacts 28 are closed, and the master subsidiary contacts 26 are open. Five volts DC is then applied to the input of NAND gate 54, thereby arming or enabling it to respond to a subsequent bus transfer when initiated by a subsequent depression of the switch 24. The subsidiary contacts 26 and 28, in combination with the NAND gates 42 and 54, function as a steering circuit for directing the operation of the timing and steering circuit 36 such that the proper solid state switches 30 or 32 are operated and released in correspondence with the actuation of main contacts 18 and 20.

When it is again desired to transfer the power from one source to the other, the switch 24 need only be depressed a second time. When this occurs, the transformer 76, rectifier diode pairs 72 and 74 and filter circuit 70 will produce another positive pulse which is applied to the inputs of NAND gates 42 and 54. In this condition, NAND gate 54 will have logic highs on its inputs, thereby clearing the latch 84 and triggering the 100ms timer 90. As a result, the solid state switch 30 will be connected across the auxiliary main contacts 20. When the auxiliary main 20 and associated subsidiary contacts 28 open, the resistor of the capacitor-resistor network 56 will cause a negative-going pulse to be coupled through capacitor 58 to trigger the zero crossing timer 60. The rising edge of the output pulse produced by timer 60 will be coupled through inverter 80, NAND gate 110 and inverter 114 to reset the 100 ms timer 90, thereby removing the drive from the solid state switch 30.

The output pulse of the 100 ms timer 90 may thereby be truncated prematurely by the reset pulse before it is driven to a logic low by the inherent time constraints of the timer 90 itself. On the falling transition of the output pulse of zero crossing timer 60, the D-latch 78 is clocked, whereupon the 100 ms timer 88 is triggered and the dual output driver 102 is enabled to cause the firing of the solid state switch 32. The 100 ms timer 88 provides drive for the entire 100 millisecond period to the dual output driver 102 to asure that in the meantime the master main contacts 18 have closed. At the expiration of the 100 millisecond, the output of the timer 88 is driven to a logic low, thereby removing the drive from the firing circuit 34 and thus from the solid state switch 32. Again, at this point in time, the master main contacts 18 are closed, auxiliary main contacts 20 are open, and the current through the solid state switches 30 and 32 is extinguished, thereby removing them from their parallel connections across the associated main contacts. As described before, the falling edge transition of the output pulse of timer 60 triggers the 200 ms timer 94 to thereby lock out subsequent spurious signals which might tend to trigger the timers during the 200 ms time period.

Figure 3B:
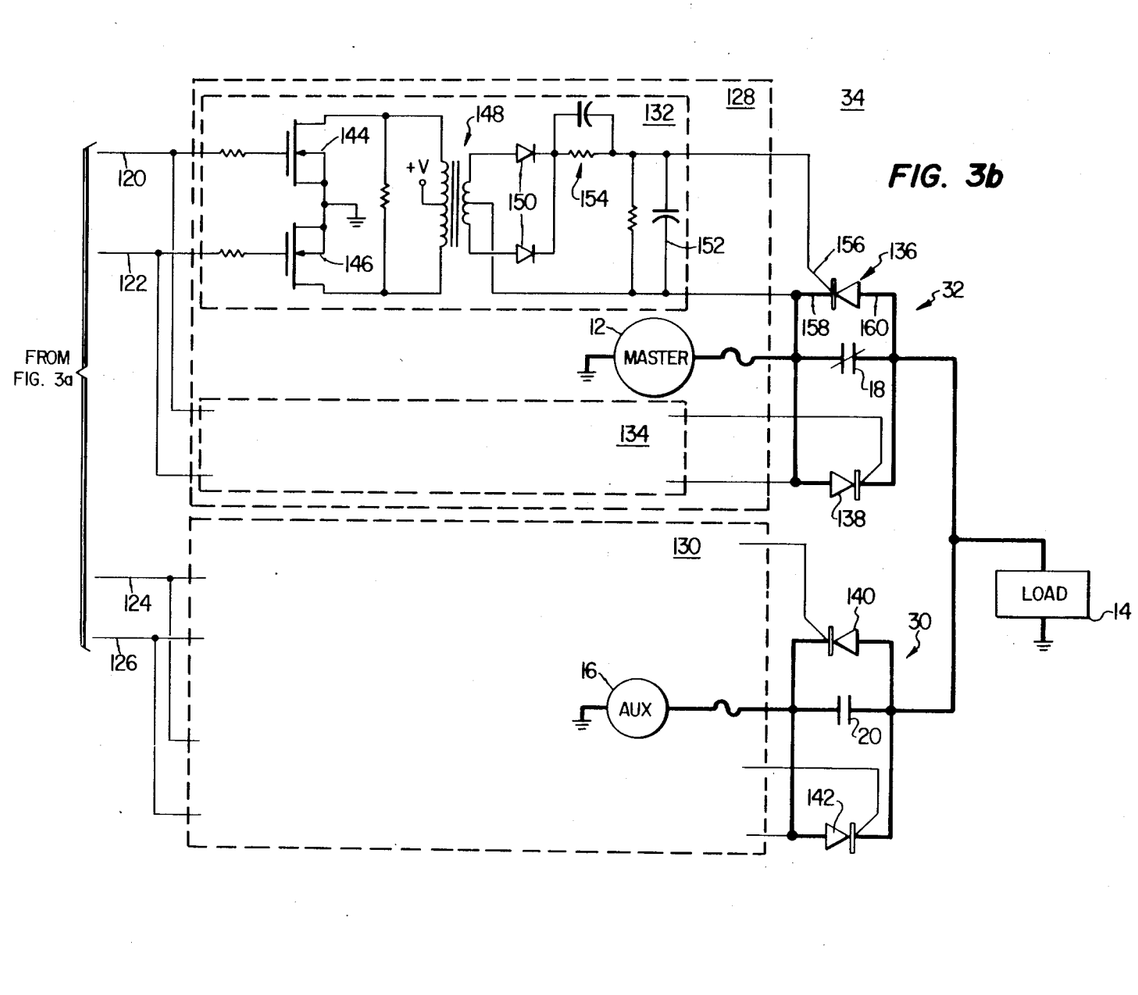

FIG. 3B is a continuation of the circuit of FIG. 3A, illustrating the firing circuit 34 of the invention. The firing circuit 34 includes a circuit 128 responsive to the dual output of driver 102 for firing the bidirectional solid state switch 32. In like manner, circuit 130 is responsive to the dual outputs of driver 108 for firing the bidirectional solid state switch 30. While the details of firing circuit 128 will be described in detail below, it should be understood that the firing circuit 130 associated with solid state switch 30 is identical in construction and function to that of circuit 128. Furthermore, the firing circuit 128 associated with the solid state switch 32 includes two identically constructed sections 132 and 134.

Firing circuit section 132 is operative to trigger a first SCR 136, while firing circuit section 134 is operative to trigger a second SCR 138. SCRs 136 and 138 are connected back-to-back to provide an AC path between the master power source 12 and the load 14. The solid state switch 30 includes SCRs 140 and 142 connected back-to-back to also form an AC path between the auxiliary power source 16 and the load 14.

With reference to firing circuit section 132, a pair of power field effect transistors 144 and 146 are driven by the respective outputs 120 and 122 of the dual output driver 102 (FIG. 3A). The source terminals of each transistor 144 and 146 is grounded, while the drain terminals thereof are connected across the primary of a transformer 148. The transformer primary has a center tap connected to a source of DC voltage. The secondary of the transformer 148 has a pair of diodes 150 functioning as a full wave rectifier, the output of which is connected to a capacitor filter 152. An RC speedup network 154 is connected between the full wave rectifier and the capacitor filter 152. The voltage output by the filter 152 is DC in nature and is connected to the gate 156 of the SCR 136. The secondary of the transformer 148 also includes a center tap connected to the cathode 158 of the SCR 136. The cathode 158 and anode 160 of the SCR 136 are connected across the master main contacts 18, with the cathode directed toward the master power source 12 and the anode directed toward the load 14. The associated SCR 138 is poled in an opposite manner across the master main contacts 18. In this manner, one SCR 136 carries current during the positive cycle of the AC power, while the other SCR 138 carries current during the negative part of the AC cycle. A bidirectional high speed switch 30 is thus provided.

As noted above, the dual signals output by each of the drivers 102 and 108 are opposite in phase. With regard to driver 102, when a logic high level signal appears on output 120, a logic low signal is presented on output 122, and vice versa. Each positive pulse of the pulse train on output 120 drives transistor 144 into conduction, whereby current flows from the primary center tap through transistor 144 and to ground. Transistor 146 is nonconducting during this period of the cycle. When, however, a positive pulse appears on output conductor 122, transistor 146 conducts, thereby driving current from the +V supply through the bottom portion of the transformer primary, and transistor 146, and to ground. As a result, the transformer 148 is driven in a push-pull manner to produce an AC signal on the secondary thereof. The diodes 150 rectify the signal, and the capacitor 152 filters the signal for driving the SCR 136 with a DC signal.

A trigger signal is similarly generated by firing circuit section 134 for triggering the SCR 138. Each section of the firing circuits 128 and 130 include a pair of transformers, similar to 148, for providing DC isolation between the power carrying circuits, and the timing and steering circuit 36. In the event that DC isolation is not required, the oscillator 118 and dual output drivers 102 and 108, as well as the firing circuit 34 can be replaced with devices adapted for directly driving the solid state switches 30 and 32 with DC trigger signals.

The foregoing discloses the preferred embodiment of the automatic bus transfer enhancer constructed in accordance with the invention. The enhancer is completely transparent with respect to conventional automatic or manual bus transfer equipment, and thus can be retrofitted without changing or significantly interrupting operation of the equipment. In addition, the automatic bus transfer enhancement equipment of the invention extend the life of the existing bus transfer equipment, and particularly the main contacts by providing a shunt current path therearound before the opening and during the closing of the contacts. The shunt current path is provided by a high speed switched device, and in a timed manner, so as to react more quickly than the contactor main contacts to provide the shunt path prior to the closing or opening of the main contacts. Timer means are also provided for maintaining the shunt path until it is assured that the contactor main contacts have completely closed or opened, as the case may be.

While the preferred embodiment of the invention has been disclosed with reference to a specific automatic bus transfer enhancer structure, it is to be understood that may change in detail may be made as a matter of engineering choices without departing from the spirit and scope of the invention, as defined by the appended claims.

What is claimed is:

1. A high speed transfer circuit utilized with a first power source connectable in series with a load through a first set of switchable contacts, and a second power source connectable to the load through a second set of switchable contacts to effect a high speed transfer of the load between the first and second power sources, comprising:

a first and second solid state switch connected respectively across the first and second switchable contacts;

a timer circuit driving said first solid state switch into conduction before said first switchable contacts are operated, said timer circuit removing said drive from said first solid state switch after said first switchable contacts have been operated, and substantially simultaneously with the removal of the drive from said first solid state switch, said timer circuit drives said second solid state switch into conduction so that said second power source is connected to the load, said timer circuit being operative to remove said drive from said second solid state switch after said second switchable contacts have been operated; and inhibit means for inhibiting timer circuit from driving said solid state switches concurrently.

2. The transfer circuit of claim 1 wherein operation with an AC power output of said first and second power sources, said first and second solid state switches comprise bidirectional electrical current switches.

3. The transfer circuit of claim 1 wherein for operation with a DC power output of said first and second power sources, said first and second solid state switches comprise unidirectional electrical current switches.

4. The transfer circuit of claim 1 further including means for generating a high frequency signal, and means for rectifying said high frequency signal driving respective said first and second said solid state switches with a DC signal.

5. The transfer circuit of claim 4 further including means for generating said high frequency signal at a frequency at least 10 times greater than an operating frequency of said first and second power sources.

6. The transfer circuit of claim 1 wherein said inhibit means includes means for inhibiting the reoperation of said timer circuit for a predetermined period of time after an initial operation thereof.

7. A timer circuit controlling a high speed switchover between a generally noninductive load and first and second power sources, said timer circuit protecting a first and second solenoid operated contacts carrying electrical energy and of the type where one of the contacts is open and associated with the first power source, while the other contact is closed and associated with the second power source, comprising:
- a solenoid operable to control the opening and closing of said first and second contacts;
- a first solid state switch connected across said first contact;
- a second solid state switch connected across said second contact;
- first means for driving said first solid state switch;
- second means for driving said second solid state switch;
- signal generating means responsive to the energization of said solenoid for generating a signal for triggering said first solid state switch;
- means responsive to the opening of the first contact for removing the triggering of said first solid state switch and for substantially simultaneously triggering said second solid state switch such that a high speed switchover between the first and second power sources is effected; and
- means for removing the triggering of said second solid state switch after the second contacts have been closed.

8. The timing circuit of claim 7 further including means for delaying the triggering of said second solid state switch after the removal of the triggering of said first solid state switch.

9. The timing circuit of claim 8 wherein said delay means includes means for generating a delay associated with an AC cycle of the electrical energy carried by first and second contacts.

10. The timing circuit of claim 9 wherein said delay means generates a delay time greater than one half the cycle of the AC electrical energy.

11. The timing circuit of claim 7 wherein said means responsive to the energization of the solenoid comprises means responsive to a solenoid voltage for generating a pulse indicating the electrical energization of the solenoid.

12. The timing circuit of claim 11 further including steering means for detecting which of the first or second contacts are closed, and for steering the pulse toward the means responsive to the solenoid energization for triggering said first solid state switch.

13. The timing circuit of claim 12 wherein said first and second contacts define a set of main contacts, and wherein said detecting means comprises a first and second subsidiary contact, each operating in conjunction with respective said first and second main contacts.

14. The timing circuit of claim 7 further including a timer for generating a first time in which said means for triggering said second solid state switch effects said triggering, and for generating a second time in which said means for removing the trigger effects the removal of said triggering.

15. The timing circuit of claim 14 wherein said timer generates a pulse with a leading transition defining said first time and a trailing transition defining said second time.

16. The timing circuit of claim 15 wherein said timer includes means for generating a pulse having a width defining a time which is greater than the time needed for the second contact to close.

17. The timing circuit of claim 7 wherein said first and second solid state switches each comprise an SCR.

18. A timer circuit protecting a first and second solenoid operated mechanical contact carrying electrical energy, and of the type where one of the contacts is open while the other is closed, and of the type having subsidiary contacts associated with the main contacts, comprising:
- a solenoid operable to control the opening and closing of said first and second contacts;
- a first and second solid state switch, each connected across a respective one said first or second main contacts;
- pulse forming means responsive to the energization of said solenoid for generating a pulse;
- a first timing and steering circuit and a substantially functional identical second timing and steering circuit, each said timing and steering circuit being associated withone said first or second solid state switch;
- said first timing and steering circuit comprising
  - a logic gate with an input connected to one said subsidiary contact and an input connected to said pulse forming means;
  - a latch responsive to an output of said logic gate;
  - a first timer responsive to the output of said latch for generating an output pulse of a predetermined width;
  - a driver responsive to the output of said first timer for driving said first solid state switch; and
  - a second timer for generating a first and second time period in response to the actuation of the other said subsidiary contact to actuate said latch to thereby drive said first solid state switch.

19. The timing circuit of claim 18 further including a lockout circuit for preventing the recurrent operation of said second timer means within a predetermined period of time.

20. The timing circuit of claim 18 further including means responsive to the output of said first timer for resetting said latch after actuation by one of said logic gate or by said second timer.

21. The timing circuit of claim 18 wherein said solid state switch comprises a pair of SCRs, and further including means for generating a burst of pulses corresponding to the drive for said solid state switch, and for rectifying said pulses to form a pulse for driving said first solid state switch.

22. The timing circuit of claim 21 further including a transformer for coupling said burst of signals.

23. A method providing a high speed transfer between a load and a first and second AC power supplies, and providing contact protection for a bus transfer system having a pair of solenoid operated contacts arranged so that one contact which is associated with the first power source and the load is open when the other contact which is associated with the second power source and the load is closed, comprising the steps of:
- detecting an electrical energization of a solenoid associated with the pair of contacts, and in response thereto establishing a first conductive path around the closed contact before the closed contact begins to open;
- detecting the opening of the closed contact;
- removing said first conductive path in response to the detection of the opening of the closed contact and substantially simultaneously establishing a second conductive path around the open contact before the open contact closes; and maintaining the second conductive path for a predetermined period of time and thereafter removing said second conductive path.

24. The method of claim 23 further including establishing said second conductive path a predetermined period of time after said first conductive path has been removed.

25. The method of claim 23 wherein the detection of the opening of the closed contacts is effected by detecting the operation of a subsidiary contact which operates in conjunction with the closed contact.

* * * * *